(12) United States Patent
Matz et al.

(10) Patent No.: US 6,482,776 B1
(45) Date of Patent: Nov. 19, 2002

(54) AMPHOLYTE POLYMER COMPOSITION AND METHOD OF USE

(75) Inventors: Gary F. Matz, Carnegie, PA (US); Richard R. Lamar, Follansbee, WV (US); Allan L. Melby, Cranberry Township, PA (US); Nicholas F. Vozza, Burgettstown, PA (US)

(73) Assignee: Calgon Corporation, Naperville, IL (US)

( * ) Notice: Subject to any disclaimer, the term of this patent is extended or adjusted under 35 U.S.C. 154(b) by 90 days.

(21) Appl. No.: 09/618,090

(22) Filed: Jul. 17, 2000

Related U.S. Application Data

(60) Provisional application No. 60/144,439, filed on Jul. 16, 1999.

(51) Int. Cl.⁷ ............................ C09K 7/02; C08E 12/30; E21B 33/13; D21H 11/00
(52) U.S. Cl. ................... 507/120; 507/121; 526/287; 526/292.2; 166/295; 162/168.2
(58) Field of Search .................. 526/287, 292.2; 507/120, 121; 166/295; 162/168.2

(56) References Cited

U.S. PATENT DOCUMENTS

| | | | | |
|---|---|---|---|---|
| 4,540,496 A | * | 9/1985 | Peiffer et al. | 507/121 |
| 4,637,882 A | | 1/1987 | Peiffer et al. | 252/8.514 |
| 4,710,555 A | * | 12/1987 | Peiffer et al. | 526/287 |
| 4,726,906 A | * | 2/1988 | Chen et al | 507/120 |
| 4,946,916 A | | 8/1990 | Peiffer et al. | |
| 5,147,635 A | | 9/1992 | Janusz et al. | 424/72 |
| 5,216,098 A | * | 6/1993 | Ahmed et al. | 526/287 |
| 5,286,827 A | * | 2/1994 | Ahmed | 526/287 |
| 5,510,436 A | * | 4/1996 | Hille et al. | 526/287 |
| 5,607,902 A | * | 3/1997 | Smith et al. | 507/120 |
| 5,804,172 A | | 9/1998 | Ault | |
| 5,830,438 A | | 11/1998 | Dupuis | 424/45 |
| 5,844,041 A | | 12/1998 | Anderson et al. | 524/548 |
| 5,879,670 A | | 3/1999 | Melby et al. | 424/70.16 |
| 6,066,315 A | * | 5/2000 | Melby et al. | 526/287 |
| 6,329,483 B1 | * | 12/2001 | Schade et al. | 526/287 |

FOREIGN PATENT DOCUMENTS

WO    WO 98/00599    1/1998

* cited by examiner

*Primary Examiner*—Philip Tucker
(74) *Attorney, Agent, or Firm*—Margaret M. Brumm; Thomas M. Breininger

(57) ABSTRACT

Novel branched or crosslinked polymers containing (meth) acrylamidopropyltrimethyl ammonium halide; (meth) acrylic acid or 2-(meth)acrylamido-2-methylpropane sulfonic acid; methylene bis-acryamide and the like; and a $C_4$–$C_{22}$ alkyl (meth) acrylate and the use thereof in papermaking, subterranean well drilling and well cementing operations is disclosed.

9 Claims, No Drawings

AMPHOLYTE POLYMER COMPOSITION AND METHOD OF USE

CROSS-REFERENCE TO RELATED PATENT APPLICATION

This patent application is claiming priority from Provisional U.S. patent application Ser. No. 60/144,439, filed Jul. 16, 1999, entitled, "AMPHOLYTE POLYMER COMPOSITION AND METHOD OF USE".

FIELD OF THE INVENTION

The present invention relates to novel ampholyte polymers, polymer compositions and methods for using such polymers in applications wherein polymer deposition and substantivity is important. In general terms, the polymers and polymer compositions of the present invention are believed to be useful in the treatment of substrates or used in combination with substrates such as those that are composed primarily of cellulose, minerals, pigments, clays and cement or in the area of cosmetics.

BACKGROUND OF THE INVENTION

The interaction of polyelectrolyte with substrates that carry a charge is at the heart of many industrial processes. The basic science that explains the function of coagulants and flocculants can be applied to many end use applications, such as paper manufacturing, cosmetics dispersion and suspension stabilization, as well as fluid loss control in oil field cementing and drilling operations.

Polyelectrolytes are for example used in the papermaking process. Papermaking, as it is conventionally known, is a process of introducing an aqueous slurry of pulp or wood cellulosic fibers (which have been beaten or refined to achieve a level of fiber hydration and to which a variety of functional additives can be added) onto a screen or similar device in such a manner that the water is removed, thereby forming a sheet of the consolidated fibers, which upon pressing and drying can be processed into dry roll or sheet form. Two well known papermaking operations involve the Fourdrinier machine, the most common, and the cylinder machine. In the Fourdrinier and multicylinder operations, and in other machine operations, as typical in papermaking, the feed or inlet to the machine is an aqueous slurry or water suspension of pulp fibers which is provided from what is called the "wet end" system. In the wet end, the pulp along with other additives are mixed in an aqueous slurry and subject to mechanical and other operations such as beating and refining to improve interfiber bonding and other physical properties of the finished sheet. Additives commonly introduced along with the pulp fibers are pigments such as titanium dioxide, mineral fillers such as clay and calcium carbonate and other materials introduced into paper to achieve such properties as improved brightness, opacity, smoothness, ink receptivity, fire retardant, water resistance, increased bulk, etc. Also useful in papermaking are colloidal inorganic minerals, such as colloidal silica, which are added to what is typically known as a microparticle system to give better sheet formation.

The term "paper, as used herein, includes sheet-like masses and molded products made from natural sources, synthetics such as polyamides, polyesters, rayon and polyacrylic resins as well as from mineral fibers such as asbestos and glass. In addition, paper made from combinations of cellulosic and synthetic materials are applicable herein. Paperboard is also included within the broad term "paper".

There remains a need for an additive that will substantively bind the fibers and other additives while not negatively impacting water removal from the forming sheet.

In an ink jet recording method, recording is generally carried out by jetting fine drops of ink using a variety of mechanisms so as to form images on a recording paper. Therefore, the recording method of ink jet type has advantages in that it is less noisy, can provide full-color prints with ease and enables high-speed printing, compared with the recording method of dot impact type.

For the paper used in such an ink jet recording method, it is usually required to have properties of (1) ensuring high-speed drying of ink, (2) being free from cissing, feathering and overflowing of ink, (3) providing recorded images of high optical density, and (4) causing no rippling trouble upon absorption of ink.

In addition, ink jet printers have had remarkable development in recent years, so that they have come to ensure considerable colorfulness and vividness in the recorded images. Thus, recording media also have been required to be higher grade merchandise. As matters now stand, it is known that higher grade recorded image which can give such a feeling of higher quality as those provided by photography or high grade printed matter can be obtained by choosing a recording medium having a glossy surface.

However, the need for reduction in running cost has also grown in proportion as prices of ink jet printers have declined. Since most of glossy recording media on the market use as their substrates more expensive materials, such as plastic films or laminated papers, they cannot meet the aforesaid need.

In contrast to the recording media on the market in which films or the like are used as substrate, cast-coated paper uses low-priced paper as a substrate and can be prepared in a relatively simple process, so that it has the advantage of a substantially lower cost. Further, as the recording side of cast-coated paper can be rendered glossy, the cast-coated paper is suitable for ink jet recording paper which can give a feeling of high quality and can provide high grade recorded images at a lower price.

High grade ink jet images depend on the formation of "dots" that contrast sharply with the color of the paper. If the ink jet dyes "wick into the paper with the ink vehicle, "fuzzy" dot boundaries result and color intensity is decreased. There remains a need for a material that will substantively bind dye or pigment particles to the surface of ink jet printed paper so that sharply contrasting intense dots are formed.

Another area in which polyelectrolytes provide benefit is in drilling fluids. It is well known that in perforating earthen formations to tap subterranean deposits such as gas or oil, that perforation is accomplished by well drilling tools and a drilling fluid. These rotary drilling systems consist of a drilling bit fitted with appropriate 'teeth', then a set of pipes assembled rigidly together end to end, the diameter of which is smaller than that of the drilling bit. This whole rigid piece of equipment, drill bit and drill pipe string, is driven into rotation from a platform situated above the well being drilled. As the drill bit attacks and goes through the geological strata, the crushed mineral materials must be cleared away from the bottom of the hole to enable the drilling operation to continue. Aqueous clay dispersion drilling fluids are recirculated down through the hollow pipe, across the face of the drill bit, and upward through the hole. The drilling fluid serves to cool and lubricate the drill bit, to raise the drilling cuttings to the surface of the ground, and to seal the sides of the well to prevent loss of water and drilling fluids into the formation through which the drill hole is being bored. After each passage through the well, the mud is passed through a settling tank or trough wherein the sand and drill cuttings are separated, with or without screening. The fluid is then again pumped into the drill pipe by a mud pump.

Some of the most serious problems encountered in producing and maintaining effective clay-based aqueous drilling fluids are caused by the interaction of the mud with the earth formation being drilled. These interactions include contamination of the mud by formation fluids, incorporation into the mud of viscosity producing and inert drilled solids, chemical contamination by drilled solids, or by the infiltration of sea-water and/or fresh water. The conditions of high temperature and pressure inherent with deeper and deeper drilling operations, together with formation interactions, make drilling fluid behavior unreliable and difficult to reproduce.

Characteristics of an ideal drilling fluid would then include the following:
  i) To have Theological characteristics as desirable as possible to be able to transport the mineral cuttings set in dispersion.
  ii) To allow the separation of cuttings by all known means as soon as the mud flows out of the hole.
  iii) To have such required density as to exert sufficient pressure on the drilled geological formations.
  iv) To retain its fundamental rheological qualities as it is submitted, in very deep drilling, to higher and higher temperatures.

There remains a need for a material, which will provide these functions while not being degraded by the mechanical action of drilling.

Polyelectrolytes are also used in oil field cementing operations. Hydraulic cement compositions are used for carrying out various operations in oil, gas and water wells including, but not limited to construction and completion operations such as squeeze cementing. Primary cementing involves the placement of a hydraulic cement composition into the annular space between the walls of a well bore and the exterior of a pipe such as casing disposed therein. The cement composition is pumped into the annular space and allowed to set into an annular cement sheath therein whereby the pipe is bonded to the walls of the well bore by the set cement.

As used herein, the term "cement" refers to portland cement, concrete and other mixtures of calcium oxide and sand.

Squeeze cementing techniques usually involve the undesirable movement of oil, gas or water through small holes or cracks in pipe disposed in the well bore; holes, cracks, voids or channels in the annular cement sheath between the pipe and the well bore; annular spaces between the cement sheath and the pipe or the walls of the well bore and permeable zones or fractures in subterranean formations. Such holes, cracks, etc. are plugged by squeezing hydraulic cement compositions therein which harden and form impermeable plugs.

In performing cementing operations in such wells, the cement compositions are often subjected to high temperatures, particularly when the cementing is carried out in deep subterranean zones. The high temperatures can cause premature setting of the cement compositions, i.e., the compositions can not be pumped for long enough times before setting to place them in the zones to be cemented. This requires the use of set retarding additives in the cement compositions which extend the setting times of the compositions so that adequate pumping time is provided in which to place or displace the compositions into desired subterranean zones.

There remains a need for an effective polymer, which will not degrade under the temperatures, pressures and mechanical action of oil field cementing operations.

In all of the applications outlined above, polymers have been used to improve the properties of the substrate or minimize adverse consequences. For example During paper manufacture, polymers are used to provide faster dewatering of the sheet, which leads to faster, more economical machine utilization. Polymers are also added during paper manufacture to improve the strength, or resistance to tearing, of the resulting sheet. Polymers are also added to paper coatings to improve the gloss of the sheet and to provide a surface that results in fast drying well defined dots from the ink jet printing process. Polymers are added to drilling fluids and cementing compositions to aid in performance and minimize water loss to the surrounding rock formation. In all of these applications, the polymer must be substantive to the substrate, meaning that it will adhere or adsorb onto the substrate surface and not be easily removed. Although many polymers are used in the aforementioned applications, there still remains a shortcoming in that they can be removed from the substrate due to physical action.

U.S. Pat. No. 4,842,849 discloses compositions suitable for treating keratin comprising at least one cationic polymer including poly(dimethyldiallylammonium chloride), and at least one anionic polymer containing vinylsulfonic groups, optionally copolymerized with acrylamide. The cationic polymer may be an amphoteric polymer as defined.

EP 0 080 976 discloses aqueous hair-cosmetic compositions containing a surface active polymeric acrylic-based quaternary ammonium salt, a monomeric or oligomeric ammonium salt, and a surface active nonionic, anionic or zwitterionic component.

U.S. Pat. Nos. 4,128,631 and 4,065,422 disclose a method of imparting lubricity to keratinous substrates such as skin or hair by contacting said substrates with a salt of 2-acrylamido-2-methylpropane sulfonic acid (AMPSA) having a molecular weight of from 1–5 million.

U.S. Pat. No. 4,772,462 discloses hair products containing a copolymer of dimethyl diallyl ammonium chloride and acrylic acid. These polymers are limited in that they rely solely on ionic interactions to be substantive to substrates.

U.S. Pat. Nos. 5,296,218; 5,609,862; and 5,879,670 disclose ampholyte polymers including terpolymers providing superior conditioning properties in shampoos and other hair care products. These polymers also rely primarily on ionic interactions for substantivity, however, the ionic charge is pH dependent which limits utility.

U.S. Pat. No. 4,077,930 discloses ampholyte polymers in a water in oil emulsion from that are useful as drainage and retention aids during the manufacture of paper. These polymers have limited utility as their only means of achieving substantivity is through ionic mechanisms.

U.S. Pat. Nos. 4,455,240; 4,652,623; 4,726,906; and 5,032,295 disclose ampholyte polymers for use as filtration control aids in drilling muds. These polymers rely only on ionic interactions to achieve substantivity, however, the charge in the polymers changes with pH which limits utility.

SUMMARY OF THE INVENTION

The composition comprises a branched or crosslinked ampholyte polymer containing monomer moieties of: (a) at least one monomer selected from the group consisting of acrylamidopropyltrimethyl ammonium halide and methacrylamidopropyltrimethyl ammonium halide; b) at least one monomer selected from the group consisting of acrylic acid, methacrylic acid, 2-acrylamido-2-methylpropane sulfonic acid and 2-methacrylamido-2-methylpropane sulfonic acid; c) at least one monomer selected from the group consisting of up to 1% N,N'-methylenebisacrylamide (MBA), triallyl methyl ammonium chloride (TAMAC), allyl methacrylate (AM), n-methylol acrylamide (nMA), polyethylene glycol dimethacrylate (PEGDMA), ethylene glycol dimethacrylate (EGDMA), diethylene glycol dimethacrylate (DEGDMA), 1,6-hexanediol dimethacrylate (HDMA), and allyl sucrose (AS); and (d) at least one monomer selected from the group consisting of up to 70% of a $C_4$–$C_{22}$ straight or branched chain alkyl acrylate or alkyl methacrylate; wherein the mol ratio of a): b) ranges from about 20:80 to about 95:5 and the weight average molecular weight of said polymer, as determined by viscometry, is at least about 1,000.

DETAILED DESCRIPTION OF THE INVENTION

The branched ampholyte polymers of the present invention and compositions containing such polymers are novel and unexpected because of their unique structure and improved substantivity.

The instant invention is directed to novel branched or crosslinked ampholyte polymers and polymer compositions and to the use of the same in the treatment of various substrates such as cellulose, paper, pigments, minerals, clays or cements. They also can be used in cosmetics.

Cellulosic substrates include, but are not limited to paper, cardboard and films. Minerals include, but are not limited to calcium carbonate, aluminum oxide, calcium sulfate and talc. Pigments include, but are not limited to titanium dioxide and iron oxide. Clays include, but are not limited to kaolinite, bentonite and anorthite. Cement includes, but is not limited to portland cement, concrete and other mixtures of calcium oxide and sand.

In particular, the instant invention is directed to a branched or crosslinked ampholyte polymer prepared from or comprising: (a) 1 to about 99 mol % acrylamidopropyltrimethyl ammonium chloride (APTAC) and/or methacrylamidopropyltrimethyl ammonium chloride (MAPTAC); (b) 1 to about 80 mol % acrylic acid (AA), methacrylic acid (MAA), 2-acrylamido-2-methylpropane sulfonic acid (AMPSA) and/or 2-methacrylamido-2-methylpropane sulfonic acid (MAMPSA); (c) 0.0001 to about 1 mol % N,N'-methylenebisacrylamide (MBA), triallyl methyl ammonium chloride (TAMAC), allyl methacrylate (AM), n-methylol acrylamide (nMA), polyethylene glycol dimethacrylate (PEGDMA), ethylene glycol dimethacrylate (EGDMA), diethylene glycol dimethacrylate (DEGDMA), 1,6-hexanediol dimethacrylate (HDMA), and allyl sucrose (AS) and (d) 0.1 to about 70 mol percent, of a $C_4$–$C_{22}$ straight or branched chain alkyl acrylate or methacrylate, preferably a $C_8$–$C_{18}$ alkyl acrylate or methacrylate and most preferably stearyl methacrylate, wherein the upper mol percent of d) in the instant polymers is limited by solubility considerations. Preferably, the mol ratio of a): b) in said branched or crosslinked ampholytic polymer ranges from about 20:80 to about 95:5, more preferably from about 25:75 to about 75:25. Further, the weight average molecular weight of said polymer, as determined by viscometry, is at least about 1,000, preferably from about 10,000 to about 10,000,000, more preferably from about 100,000 to about 8,000,000. Alternatively, gel permeation chromatography (GPC) with light scattering detection can be used.

Preferably, the mol ratio of a):b) ranges from 25:75 to about 75:25, the preferred polymers contain 0.0001 to 0.1 mol % of branching or crosslinking agent c), and the preferred polymers contain at least about 1 up to about 20 mol % of the above-defined acrylate or methacrylate esters. More preferably, the instant polymers contain about 1 to about 10 mol % of the acrylate or methacrylate ester moiety. In the most preferred case, the alkyl acrylate or methacrylate is stearyl methacrylate or stearyl acrylate.

The instant invention is also directed to a water soluble branched or crosslinked ampholyte polymer comprising:

a) about 20 to about 95 mol % APTAC or MAPTAC, preferably MAPTAC;

b) about 5 to about 80 mol % acrylic acid, methacrylic acid, AMPSA or MAMPSA, preferably acrylic acid;

c) about 0.0001 to about 0.1 mol % MBA, TAMAC. AM, nMA, PEGDMA, EGDMA, DEGDMA, HDMA or AS, preferably MBA, TAMAC or AS, and d) 0.1 to about 20 mol %, preferably 1 to about 10 mol %, of a $C_8$–$C_{22}$ straight or branched chain alkyl acrylate or methacrylate, preferably a $C_4$–$C_{18}$ alkylacrylate or methacrylate and most preferably stearyl methacrylate or stearyl acrylate, wherein the molecular weight of said polymers is at least about 1,000.

Preferably, the instant invention is directed to a water soluble branched ampholyte polymer comprising:

a) about 25 to about 75 mol % DMDAAC, APTAC or MAPTAC;

b) about 25 to 75 mol % acrylic acid or methacrylic acid;

c) about 0.0001 to 0.1 mol % MBA, TAMAC or AS, and d) about 1 to about 50 mol % of a $C_4$–$C_{18}$ straight or branched chain alkyl acrylate or methacrylate, wherein the molecular weight of said polymer is at least about 1,000.

Further, the instant invention is directed to a method for treating a substrate comprising contacting said substrate with the above defined branched or crosslinked ampholyte polymer, preferably with an effective amount of said polymer or, an effective amount of an acceptable medium comprising from about 0.01 to about 20%, preferably from about 0.1 to about 10%, by weight, based on the total weight of said medium, of an instant water soluble branched or crosslinked ampholyte polymer.

As used herein, the term "branched or crosslinked" refers to an addition polymer, made using a free radical initiator source, which has included in the mixture of monomers employed, some content of monomer that contains multiple polymerizable double bonds. Typically, these monomers will contain between two and six polymerizable double bonds. The resulting "branched or crosslinked" polymers can remain completely water soluble, water dispersible, or in the extreme be only water swellable. The latter resulting from the situation where the level of multi double bond containing monomer results in a crosslinked and or network structure which is well known to those skilled in the art of polymer synthesis.

As used herein, the term "active basis" refers to a concentration of additive based on the active solids in the stock solution.

As used herein, the term "effective amount" refers to that amount of a composition necessary to bring about a desired result, such as, for example, the amount needed to treat a substrate relative to a particular purpose, such as the amount of a composition necessary to provide good ink jet printing on paper, such as minimal feathering.

Turning now to each of the components of the instant ampholyte polymers, the cationic component is either acrylamidopropyl-trimethyl ammonium chloride (APTAC) or methacrylamidopropyltrimethyl ammonium chloride (MAPTAC), which may be represented as follows:

MAPTAC

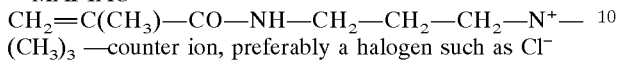

—counter ion, preferably a halogen such as $Cl^-$

APTAC

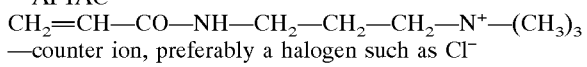

—counter ion, preferably a halogen such as $Cl^-$

These monomers are hydrolytically stable, which enable them to remain intact and interact with target substrates under severe temperature and pH conditions. MAPTAC is the preferred cationic monomer.

The cationic MAPTAC/APTAC monomer portion of the ampholyte polymers of the instant invention is present in an amount such that the cationic:anionic mol ratio ranges from about 20:80 to about 95:5

The second component of the ampholyte polymers of the present invention is the anionic monomer acrylic acid (AA) or methacrylic acid (MAA), which may be represented by the following formula:

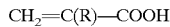

where R is H or $CH_3$.

Additionally, 2-acrylamido-2-methylpropane sulfonic acid (AMPSA) or 2-methacrylamido-2-methylpropane sulfonic acid (MAMPSA), preferably AMPSA, can be used as component (b), alone or in combination with acrylic acid or methacrylic acid. These monomers are represented as follows:

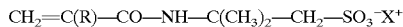

wherein R–H or $CH_3$ and X=suitable salt forming cation.

The third component is the branching agent N,N'-methylenebisacrylamide (MBA), triallyl methyl ammonium chloride (TAMAC), allyl methacrylate (AM), n-methylol acrylamide (nMA), polyethylene glycol dimethacrylate (PEGDMA), ethylene glycol dimethacrylate (EGDMA), diethylene glycol dimethacrylate (DEGDMA), 1,6-hexanediol dimethacrylate (HDMA), or allyl sucrose (AS). The branching agent can be represented as follows:

Wherein R=acrylamide, methacrylamide, acrylate, methacrylate or allyl and O=a glycol, polyol, sugar or $C_{1-12}$ alkane.

The fourth mer unit of the instant invention is an alkyl acrylate, methacrylate represented as follows:

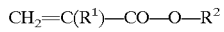

wherein $R^1$=H or $CH_3$ and $R^2=C_4-C_{22}$

Preferably, this mer unit is a $C8-C_{18}$ alkyl acrylate or methacrylate or acrylamide, with stearyl methacrylate and stearyl acrylate being most preferred.

The instant polymers may be prepared by conventional solution polymerization techniques, as indicated below and in the Examples. Thus, to prepare the instant polymers the appropriate weights for the desired mol %'s of DMDAAC/APTAC/MAPTAC, acrylic acid or other anionic monomers and MBA or other branching agent are charged to a glass reactor equipped with a stirring means. The desired amount of alkyl acrylate, methacrylate or acrylamide is then added to the reactor with vigorous stirring to give the desired total monomer concentration, which is generally about 10–25% by weight. The monomer mixture may then be adjusted to a pH of about 3.0 to about 6.5 with dilute NaOH, heated to about 55° C., and purged with nitrogen for at least thirty minutes. Polymerization is then initiated by adding about $5 \times 10^{-2}$ mol % of sodium persulfate and about $2.4 \times 10^{-3}$ mol % of sodium bisulfate. After the peak exotherm is reached, additional dilution water and sodium bisulfite are added to scavenge any residual monomer and to dilute the final product to 4–8% polymer solids.

Representative of the best mode known to the inventors are polymers wherein the mol percentages of MAPTAC/AA/octyl acrylate/MBA are 45/45/9.9999/0.0001, MAPTAC/AA/stearyl methacrylate/MBA are 49/49/1.9999/0.0001, APTAC/AA/lauryl methacrylate/TAMAC are 65.99/30/4/0.01 and MAPTAC/AA/stearyl acrylate/SA are 49.999/48/2/0.001. Methods of using such compositions are well known in the art.

The molecular weight of the ampholyte polymers of the present invention may be within the broad range of greater than about 1,000, preferably from about 10 thousand to about 10 million, and more preferably from about 100,000 to 8 million.

Reduced viscosity (dl/g) may be used as an approximate measure of the weight average molecular weight of the ampholyte polymers of the present invention. The values shown herein represent a capillary viscosity measured with Ubbelhhde Capillary Viscometer at 0.05% concentration of polymer in a 1M NaCl solution, pH 7, at 30° C. The resulting molecular weight value is calculated in accordance with methods well known in the art.

The composition of the instant invention can generally be successfully added to aqueous cellulosic furnishes over the entire pH range customarily employed in the papermaking process. Preferably, the composition of the instant invention is added to aqueous cellulosic furnishes having a pH from about 3 to 10. Therefore, it will be appreciated by those skilled in the art that the composition of the instant invention may be added to aqueous cellulosic paper furnishes that are acid, alkaline, or neutral in character. It will be understood by those skilled in the art that generally an acid furnish has a pH range from about 3.0 to 5.5, an alkaline furnish has a pH range from about 7.0 to greater than about 10.0, and a neutral furnish has a pH range of from about 5.5 to 7.0.

In another embodiment of this invention, a process is provided for in which paper or paperboard having improved properties is made by forming an aqueous cellulosic paper furnish which comprises adding to the furnish an effective amount, based on the dry weight of the solids of the furnish, of a high molecular weight branched ampholytic polymer, as hereinbefore described.

The instant invention is also directed to a method for drilling a well in a subterranean formation comprising circulating into the well, during drilling an aqueous drilling fluid, the improvement wherein said aqueous drilling fluid comprises:

(a) an aqueous clay dispersion; and (b) the above-described polymer.

The clay dispersion may be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clay subsurface formations are drilled. Weighting materials added to increase specific gravity such as barites, iron oxide, and the like may also be included.

The aqueous medium may be fresh water such as is obtained from wells or streams; it may be salt water from the sea or from wells; or, it may even include oil-in-water emulsions, i.e., water which has become contaminated in some way with small quantities of oil, or to which such oil has been added to gain some desired advantage. The polymers of the instant invention were found to be particularly effective in salt water and to be stable at high temperature. The drilling mud containing the polymers of the instant invention show both good filtration and rheology properties.

It is contemplated that the drilling muds of the invention may also contain other additives besides the polymers of the invention. Materials such as caustic, quebracho, lime and the like may be added to the drilling mud at the surface while other materials such as gypsum, shale and the like may be encountered in subsurface formations during drilling operations.

When employed in accordance with the invention, the polymer may be added directly to the drilling mud as a dry powder, as a slurry suspended in a suitable liquid, or as a solution in water or some other suitable solvent, and they may be incorporated therein at any convenient point in the mud circulation system. It may be desirable to employ a mixing device such as a cone and jet mixer or the equivalent for incorporating the additive in the mud.

The present invention is also directed to cementing compositions that are useful in oil, gas and water well cementing operations since such compositions have reduced fluid loss to the surrounding formation. Such compositions are used to cement a conduit penetrating a permeable earthen formation via introducing such composition into the space between such conduit and such formation and allowing the composition to harden. These cementing compositions for use in oil, gas and water well cementing operations comprise water, hydraulic cement, and the branched or crosslinked ampholyte polymer of the present invention.

EXAMPLES

Example 1

Preparation of a 49/49/1.9994/0.0006 M/M Polymer of AA/Maptac/Stearyl Methacrylate/N,N'-Methylenebisacrylamide A 49/49/1.9994/0.0006 M/M/M/M polymer of acrylic acid/MAPTAC stearyl methacrylate/n,n'-methylenebisacrylamide was prepared as follows:

1. Zeolite softened water, acrylic acid, MAPTAC and MBA (Items 1, 2, 3 and 4 in Table 1, below) were added to a glass-lined reactor in the amounts shown, and stirred until uniform.
2. Stearyl methacrylate monomer (Item 5) was then added to the reactor.
3. The mix temperature was held below 30° C., and the reactor was purged with nitrogen for 45 minutes.
4. After 45 minutes, the purge rate was reduced, and the mix was heated to 55+1° C. This purge rate was continued until the completion of Step 12.
5. V-501 ($2,2^1$—azobis (2-amidino propane) dihydrochloride) was slurried in water (Item 6) in a separate mix container.
6. A V-50 (4, $4^1$—azobis (4-Cyanovaleic acid)) solution in water (Item 7) was prepared in another mix tank. Steps 5 and 6 were completed during the purge and heat up.
7. The V-501 slurry was added to the reactor followed by the V-50 solution.
8. After a brief period, the reaction admixture began to exotherm, peaking at about 90–95° C. after about 30 minutes.
9. The reaction admixture was held at the peak temperature for one hour. After one hour, water (Item 1) was added and mixed for 30 minutes or until the reaction admixture was uniform. The temperature of the reaction admixture was reduced to 70–75° C. during the dilution step.
10. Caustic (Item 8) and water (Item 1) were mixed and added to the reactor over a 30-minute period, holding the temperature below 75° C.
11. This reaction admixture was held for 15 minutes, and the temperature increased to 80–85° C.
12. Sodium bisulfite solution was added (Item 9) over 25–35 minutes at 80–85° C. It was then mixed for 30 additional minutes and the nitrogen purge was turned off. Cooling to below 50° C. then occurred.
13. Sodium benzoate (Item 10) and water (Item 1) were mixed, and added to the reactor. This admixture was stored until uniform.

The resulting polymer, which represents the best mode known to the inventors, had a weight average % molecular weight of about $1.1\times10^6$, as determined by viscosity. The polymers comprised 49 mol % AA, 49 mol % MAPTAC 1.9994 mol % stearyl methacrylate and 0.0006 mol % n,n'-methlenebisacrylamide.

TABLE 1

AA/MAPTAC/SMA/MBA polymer 49/49/1.9994/0.0006 m/m/m/m

| ITEM | NAME | WEIGHT % |
|---|---|---|
| 1 | Zeolite Softened Water | 64.30689 |
| 2 | Acrylic Acid, 100% active | 4.430 |
| 3 | MAPTAC, 50% active | 26.890 |
| 4 | N,N'-methylenebisacrylamide, 100% active | 0.00011 |
| 5 | SMA*, 100% active | 2.175 |
| 6 | V-501 | 0.013 |
| 7 | V-50 | 0.038 |
| 8 | Caustic soda, 50% | 1.333 |
| 9 | Sodium Bisulfite Solution, 38% | 0.614 |
| 10 | Sodium benzoate | 0.200 |

*SMA is stearyl methacylrate ($C_{18}$ acrylate)

This sample had pH=4.0, Reduced Viscosity=2.7 dl/g and Brookfield Viscosity (LV, spindle #4, @12rpm)=23,000 cps.

Example 2

An aqueous clay based drilling mud is prepared using the polymer of Example 1 (49/49/1.9994/0.0006 m/m/m/m AA/MAPTAC/SMA/MBA) as outlined in Table 2.

TABLE 2

Clay Based Gypsum Drilling Mud

| Ingredient | Percent (w/w %) |
|---|---|
| Water | 86.0 |
| Bentonite | 3.5 |
| Rev Dust | 7.5 |
| Gypsum | 1.0 |
| Lignonsulfate | 1.0 |
| Polymer of Example 1 | 0.5 |
| Caustic | 0.5 |

The clay based gypsum drilling mud is aged for 16 hours at 325° F. and then cooled. The resulting API filtrate reading is lower for the formula of the example when compared to a corresponding clay based gypsum drilling mud without polymer.

Example 3

A cementing composition is prepared using the polymer of Example 1 (49/49/1.9994/0.0006 m/m/m/m AA/MAPTAC/SMA/MBA) as outlined in Table 3.

TABLE 3

Cementing Composition

| Ingredient | Percent (w/w %) |
| --- | --- |
| Water | 46.0 |
| Class H Cement | 43.0 |
| Polymer of Example 1 | 1.0 |

The cementing composition is mixed into a slurry. The resulting API filtrate reading (30 minute, 125° F., 1,000 psi) is lower for the formula of the example when compared to a corresponding cementing composition without polymer.

What is claimed is:

1. A composition comprising a branched or crosslinked ampholyte polymer wherein said polymer consists essentially of:
   a.) from 1 to about 99 mol % of a monomer selected from the group consisting of acrylamidopropyltrimethyl ammonium halide and methacrylamidoproplytrimethyl ammonium halide;
   b.) from 1 to about 80 mol % of a monomer selected from the group consisting of acrylic acid, methacrylic acid and 2-acrylamido-2-methylpropane sulfonic acid;
   c.) from about 0.0001 to about 1 mol % of a monomer selected from the group consisting of N,N'-methylenebisacrylamide, triallyl methyl ammonium chloride, allyl methacrylate, n-methylol acrylamide, polyethylene glycol dimethacrylate, ethylene glycol dimethacrylate, diethylene glycol dimethacrylate, 1,6-hexanediol dimethacrylate and allyl sucrose; and
   d.) from 0.1 to about 70 mol % of a monomer selected from the group consisting of $C_4$–$C_{22}$ straight or branched chain alkyl acrylate or alkyl methacrylate monomers;
wherein the mol ratio of a.): b.) ranges from about 20:80 to about 95:5 and the weight average molecular weight of said polymer is at least about 1,000.

2. The composition of claim 1 wherein:
   a.) is methacrylamidopropyltrimethyl ammonium chloride;
   b.) is acrylic acid;
   c.) is N,N'-methylenebisacrylamide; and
   d.) is stearyl methacrylate.

3. The composition of claim 1 wherein said molecular weight ranges from about 10,000 to about 10,000,000.

4. The composition of claim 1, wherein the mol ratio of a.): b.) ranges from 25:75 to about 75:25.

5. A composition comprising a branched or crosslinked ampholyte polymer wherein said polymer consists essentially of:
   a.) from about 20 to about 95 mol % of a monomer selected from the group consisting of acrylamidopropyltrimethyl ammonium halide and methacrylamidoproplytrimethyl ammonium halide;
   b.) from about 5 to about 80 mol % of a monomer selected from the group consisting of acrylic acid, methacrylic acid and 2-acrylamido-2-methylpropane sulfonic acid;
   c.) from about 0.0001 to about 1 mol % of a monomer selected from the group consisting of N,N'-methylenebisacrylamide, triallyl methyl ammonium chloride, allyl methacrylate, n-methylol acrylamide, polyethylene glycol dimethacrylate, ethylene glycol dimethacrylate, diethylene glycol dimethacrylate, 1,6-hexanediol dimethacrylate and allyl sucrose; and
   d.) from 0.1 to about 70 mol % of a monomer selected from the group consisting of $C_4$–$C_{22}$ straight or branched chain alkyl acrylate or alkyl methacrylate monomers;
wherein the weight average molecular weight of said polymer is at least about 1,000.

6. A branched or crosslinked ampholyte polymer comprising:
   a.) from about 25 to about 75 mol % of a monomer selected from the group consisting of acrylamidopropyltrimethyl ammonium halide and methacrylamidoproplytrimethyl ammonium halide;
   b.) from about 25 to about 75 mol % of a monomer selected from the group consisting of acrylic acid, methacrylic acid and 2-acrylamido-2-methylpropane sulfonic acid;
   c.) from about 0.0001 to about 0.1 mol % of a monomer selected from the group consisting of N,N'-methylenebisacrylamide, triallyl methyl ammonium chloride, allyl methacrylate, n-methylol acrylamide, polyethylene glycol dimethacrylate, ethylene glycol dimethacrylate, diethylene glycol dimethacrylate, 1,6-hexanediol dimethacrylate and allyl sucrose; and
   d.) from about 1 to about 50 mol % of a monomer selected from the group consisting of $C_4$–$C_{22}$ straight or branched chain alkyl acrylate or alkyl methacrylate monomers;
wherein the weight average molecular weight of said polymer is at least about 1,000.

7. A method for manufacturing paper or paperboard wherein the branched or crosslinked ampholyte polymer of claim 1 is added to an aqueous cellulosic paper furnish.

8. A method for drilling a well in a subterranean formation, comprising circulating into the well, during drilling, an aqueous drilling fluid comprising an aqueous clay dispersion and the branched or crosslinked ampholyte polymer composition of claim 1.

9. A method of cementing a conduit in a borehole penetrating an earthen formation by introducing a cementing composition into the space between said conduit and said formation, wherein said cementing composition comprises
   a) water;
   b) cement; and
   c) from about 0.1% to about 1.5% by weight of the branched or crosslinked ampholyte polymer composition of claim 1.

* * * * *